(12) United States Patent
Mallik et al.

(10) Patent No.: US 8,781,005 B2
(45) Date of Patent: Jul. 15, 2014

(54) SCALABLE QUANTIZATION OF CHANNEL STATE INFORMATION FOR MIMO TRANSMISSION

(75) Inventors: Siddhartha Mallik, San Diego, CA (US); Alexei Yurievitch Gorokhov, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 12/893,610

(22) Filed: Sep. 29, 2010

(65) Prior Publication Data

US 2011/0244847 A1 Oct. 6, 2011

Related U.S. Application Data

(60) Provisional application No. 61/247,763, filed on Oct. 1, 2009, provisional application No. 61/249,726, filed on Oct. 8, 2009.

(51) Int. Cl.
*H04L 27/00* (2006.01)

(52) U.S. Cl.
USPC ........... 375/259; 375/260; 375/267; 375/299; 375/346; 375/347; 375/348; 375/349

(58) Field of Classification Search
USPC ......... 375/259, 260, 267, 299, 346, 347, 348, 375/349
See application file for complete search history.

(56) References Cited

U.S. PATENT DOCUMENTS 5,623,484 A 4/1997 Muszynski
(Continued)

FOREIGN PATENT DOCUMENTS

JP 2004531975 A 10/2004
JP 2007068180 A 3/2007
(Continued)

OTHER PUBLICATIONS

Huawei: "Downlink CoMP JP Evaluation and Feedback design", 3GPP Draft; R1-093038 Downlink CoMp JP Evaluation and Feedback Design, 3rd Generation Partnership Project (3GPP), Mobile Competence Centre ; 650, Route Des Lucioles ; F-06921 Sophia-Antipolis Cedex ; France, No. Shenzhen, China; Aug. 18, 2009, XP050351431, [retrieved on Aug. 18, 2009].
(Continued)

*Primary Examiner* — Kabir A Timory

(57) ABSTRACT

Techniques for reporting channel state information (CSI) are described. A user equipment (UE) may receive data transmission from one or more cells among a plurality of cells and may report CSI for each of the plurality of cells. In an aspect, the UE may generate CSI with different quantization granularity (e.g., different codebook sizes), or different frequency granularity (e.g., different subband sizes), and/or different time granularity (e.g., different reporting intervals) for different cells based on the performance impact of each cell for data transmission to the UE. The performance impact of each cell may be determined based on a long-term channel gain or received power of the cell at the UE. The UE may quantize the CSI for each cell based on the codebook size for the cell. The UE may generate the CSI for each cell based on the subband size and/or the reporting interval for the cell.

59 Claims, 8 Drawing Sheets

(56) References Cited

U.S. PATENT DOCUMENTS

| | | | |
|---|---|---|---|
| 6,618,597 | B1 | 9/2003 | Choi |
| 8,179,844 | B2 | 5/2012 | Zheng et al. |
| 8,526,384 | B2 | 9/2013 | Jian et al. |
| 2007/0115796 | A1 | 5/2007 | Jeong et al. |
| 2007/0155392 | A1 | 7/2007 | Cho et al. |
| 2008/0043867 | A1 | 2/2008 | Blanz et al. |
| 2008/0153506 | A1 | 6/2008 | Yin et al. |
| 2009/0093222 | A1 | 4/2009 | Sarkar |
| 2009/0257423 | A1* | 10/2009 | Kwon et al. ............ 370/345 |
| 2010/0002797 | A1 | 1/2010 | Sanayei |
| 2010/0048232 | A1* | 2/2010 | Hwang et al. ............ 455/501 |
| 2010/0093287 | A1 | 4/2010 | Higuchi et al. |
| 2010/0113078 | A1 | 5/2010 | Farajidana et al. |
| 2011/0080965 | A1 | 4/2011 | Liu et al. |
| 2011/0237282 | A1 | 9/2011 | Geirhofer et al. |
| 2011/0274185 | A1* | 11/2011 | Gan et al. ............ 375/259 |
| 2012/0020319 | A1 | 1/2012 | Song et al. |

FOREIGN PATENT DOCUMENTS

| | | | |
|---|---|---|---|
| JP | 2007251924 A | | 9/2007 |
| JP | 2008236431 A | | 10/2008 |
| JP | 2013502756 A | | 1/2013 |
| WO | WO-02103920 A2 | | 12/2002 |
| WO | WO-2005125248 A1 | | 12/2005 |
| WO | 2008152986 A1 | | 12/2008 |
| WO | 2009002097 A1 | | 12/2008 |
| WO | 2009022468 A1 | | 2/2009 |
| WO | 2009024018 A1 | | 2/2009 |
| WO | WO2009030036 A1 | | 3/2009 |
| WO | 2009075099 A1 | | 6/2009 |
| WO | 2009084903 A2 | | 7/2009 |
| WO | WO2009113836 A1 | | 9/2009 |
| WO | WO2010102053 | | 9/2010 |

OTHER PUBLICATIONS

Huawei: "Feedback capacity analysis for different feedback mechanisms", 3GPP Draft; R1-092366, 3rd Generation Partnership Project (3GPP), Mobile Competence Centre ; 650, Route Des Lucioles ; F-06921 Sophia-Antipolis Cedex ; France, No. Los Angeles, USA; Jun. 24, 2009, XP050350885, [retrieved on Jun. 24, 2009].

International Search Report and Written Opinion—PCT/US2010/052097, International Search Authority—European Patent Office—Mar. 17, 2011.

NORTEL: "Higher order MIMO performance evaluations for LTE-advanced", 3GPP Draft; R1-090145(NORTEL-LTE-A_Highorder_MIM0), 3rd Generation Partnership Project (3GPP), Mobile Competence Centre ; 650, Route Des Lucioles ; F-06921 Sophia-Antipolis Cedex ; France, No. Ljubljana; Jan. 8, 2009, XP050318081, [retrieved on Jan. 8, 2009].

QUALCOMM Europe, "Comparison between MDC and MLC feedback encoding techniques", 3GPP Draft, R1-093112 Comparison MDC MLC, 3rd Generation Partnership Project (3GPP), Mobile Competence Centre , 650, Route Des Lucioles , F-06921 Sophia-Antipolis Cedex , France, No. Shenzhen, China, Aug. 19, 2009, XP050351484.

Alcatel-Lucent Shanghai Bell, Alcatel-Lucent,Weighted CSI Feedback aided DL CoMP transmissions[online], 3GPP TSG-RAN WG1#58, <URL:http://www.3gpp.org/ftp/tsg_ran/WG1_RL1/TSGR1_58/Docs/R1-093690.zip>, Aug. 28, 2009.

Huawei: "RAN2 considerations for coordinated multipoint transmission and reception", 3GPP Draft; R2-093107 RAN2 Considerations for Comp, 3rd Generation Partnership Project (3GPP), Mobile Competence Centre; 650, Route Des Lucioles; F-06921 Sophia-Antipolis Cedex; France, no. San Francisco, USA; 20090428, Apr. 28, 2009, XP050340849, [retrieved on Apr. 28, 2009].

Taiwan Search Report—TW099134436—TIPO—Jul. 12, 2013.

* cited by examiner

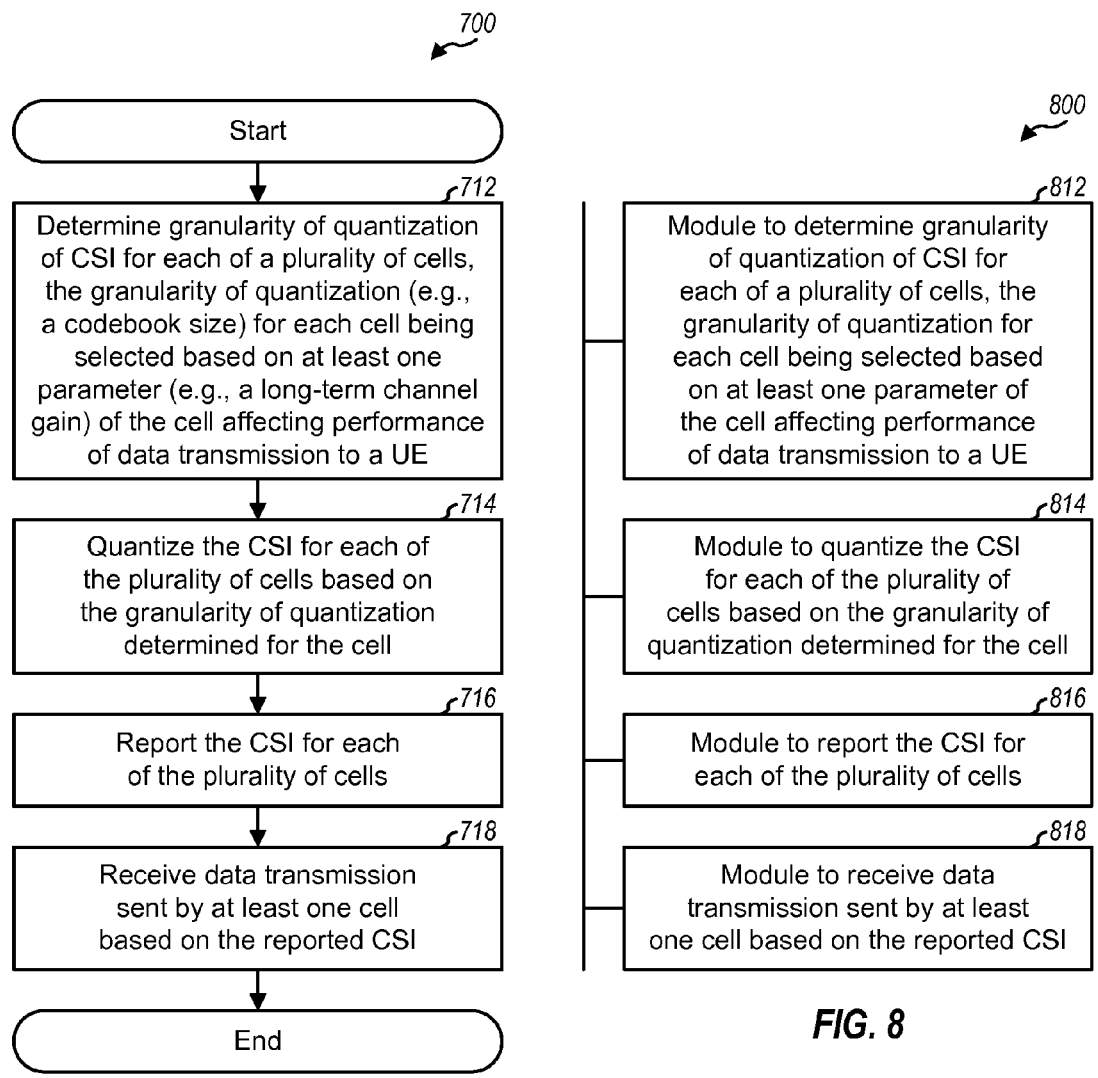

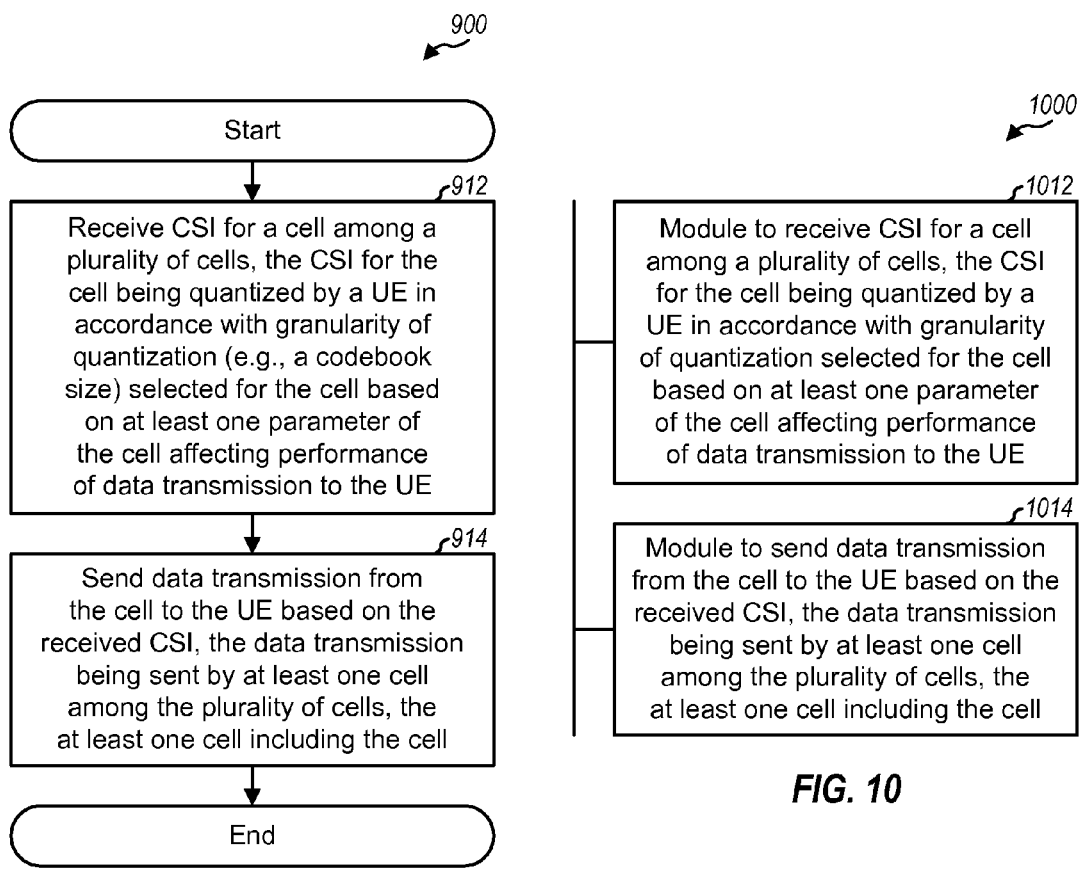

SCALABLE QUANTIZATION OF CHANNEL STATE INFORMATION FOR MIMO TRANSMISSION

The present application claims priority to provisional U.S. Application Ser. No. 61/247,763, entitled "Scalable Feedback Reporting for Network MIMO," filed Oct. 1, 2009, and provisional U.S. Application Ser. No. 61/249,726, entitled "Scalable Codebooks for Spatial Feedback in Network MIMO," filed Oct. 8, 2009, both assigned to the assignee hereof and incorporated herein by reference.

BACKGROUND

I. Field

The present disclosure relates generally to communication, and more specifically to techniques for supporting data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may be within the coverage of multiple cells, where the term "cell" can refer to a coverage area of a base station and/or a base station subsystem serving the coverage area. One or more of the multiple cells may be selected to serve the UE. It may be desirable for the UE to send feedback information such that the selected cell(s) can transmit data to the UE in a manner that can provide good performance.

SUMMARY

Techniques for reporting channel state information (CSI) to support data transmission are described herein. A UE may receive data transmission from one or more cells among a plurality of cells and may report CSI for each of the plurality of cells. The UE may generate CSI with different quantization granularity, or different frequency granularity, or different time granularity, or a combination thereof, for different cells based on the performance impact of each cell for data transmission to the UE. In general, errors in CSI for cells with weak channels may result in less performance degradation as compared to errors in CSI for cells with strong channels. Hence, good performance and/or lower feedback overhead may be obtained by (i) generating the CSI for cells having strong channels with finer granularity in quantization, or frequency, and/or time and (ii) generating the CSI for cells having weak channels with coarse granularity in quantization, or frequency, and/or time.

In one design, the UE may determine granularity of quantization of CSI for each of the plurality of cells. For example, a codebook size may be selected for each cell based on at least one parameter (e.g., a long-term channel gain) of the cell. The UE may quantize the CSI for each cell based on a codebook of the codebook size selected for the cell. In one design, the UE may determine a subband size for each cell, which may be selected based on the at least one parameter of the cell. The UE may generate the CSI for each cell based on the subband size for the cell. In another design, the UE may determine a reporting interval for each cell, which may be selected based on the at least one parameter of the cell. The UE may generate the CSI for each cell based on the reporting interval for the cell. In yet another design, the UE may determine a subband size and a reporting interval for each cell, which may be selected based on the at least one parameter of the cell. The UE may generate the CSI for each cell based on the subband size and the reporting interval for the cell. The codebook size, the subband size, and/or the reporting interval may be determined separately or jointly. The UE may report the CSI for the plurality of cells. The UE may thereafter receive data transmission sent by at least one cell among the plurality of cells based on the reported CSI.

Various aspects and features of the disclosure are described in further detail below.

BRIEF DESCRIPTION OF THE DRAWINGS

FIGS. 7 and 8 show a process and an apparatus, respectively, for reporting CSI with scalable channel feedback.

FIGS. 9 and 10 show a process and an apparatus, respectively, for receiving CSI generated with scalable channel feedback.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
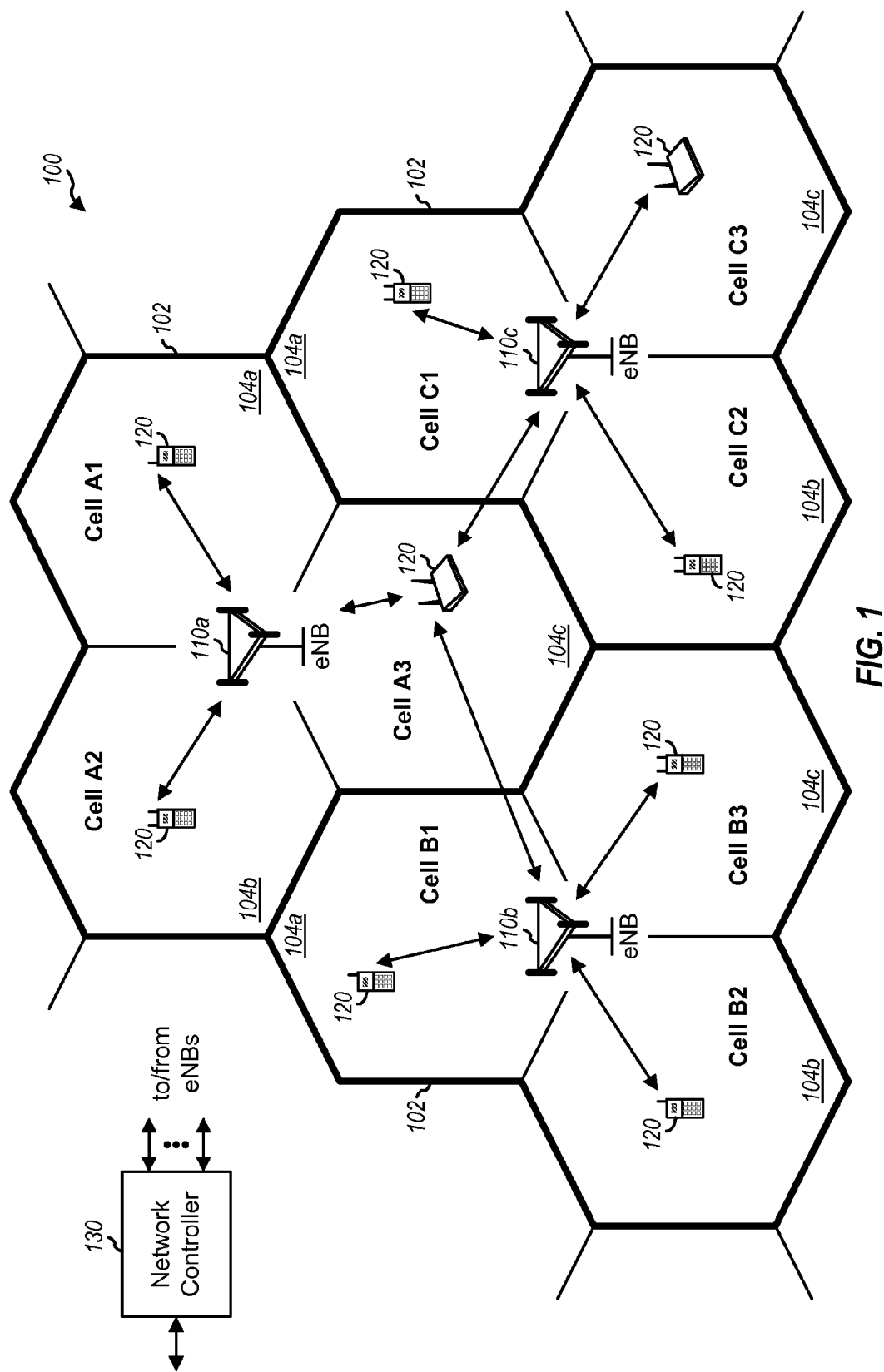
FIG. 1 shows a wireless communication network.

FIG. 1 shows a wireless communication network 100, which may be an LTE network or some other wireless network. Wireless network 100 may include a number of evolved Node Bs (eNBs) and other network entities. For simplicity, only three eNBs 110a, 110b and 110c and one network controller 130 are shown in FIG. 1. An eNB may be an entity that communicates with the UEs and may also be referred to as a base station, a Node B, an access point, etc. Each cNB 110 may provide communication coverage for a particular geographic area 102. To improve network capacity, the overall coverage area of an eNB may be partitioned into multiple smaller areas, e.g., three smaller areas 104a, 104b and 104c. Each smaller area may be served by a respective eNB subsystem. In 3GPP, the term "cell" can refer to the smallest coverage area of an eNB and/or an eNB subsystem serving this coverage area. In 3GPP2, the term "sector" or "cell-sector" can refer to the smallest coverage area of a base station and/or a base station subsystem serving this coverage area. For clarity, 3GPP concept of cell is used in the description below. In general, an eNB may support one or multiple (e.g., three) cells.

Network controller 130 may couple to a set of eNBs and may provide coordination and control for these eNBs. Network controller 130 may include a Mobile Management Entity (MME) and/or some other network entity.

UEs 120 may be dispersed throughout the wireless network, and each UE may be stationary or mobile. For simplicity, FIG. 1 shows only one UE 120 in each cell. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB.

Wireless network 100 may support Coordinated Multi-Point (CoMP), which may include downlink network multiple-input multiple-output (MIMO). For CoMP, multiple cells may coordinate to transmit data to one or more UEs on the same time-frequency resource such that signals from the multiple cells can be combined at a target UE and/or inter-cell interference can be reduced at an interfered UE. CoMP may include the following:

1. Joint processing—multi-point transmission of data from multiple cells to one or more UEs with precoding vectors at different cells being selected to achieve beamforming gain at a target UE and/or interference reduction at one or more interfered UEs, and
2. Coordinated beamforming—single-point transmission of data from a single cell to a target UE with one or more precoding vectors selected for the cell by trading between beamforming gain to the target UE and interference reduction to one or more interfered UEs served by one or more neighbor cells.

Multiple cells may transmit data to a given UE for joint processing whereas a single cell may transmit data to the UE for coordinated beamforming. However, for both joint processing and coordinated beamforming, the precoding vector(s) used by one or more cells to transmit data to the UE may be selected by considering the channels of the UE as well as the channels of other UE(s) in order to reduce inter-cell interference.

Figure 2:
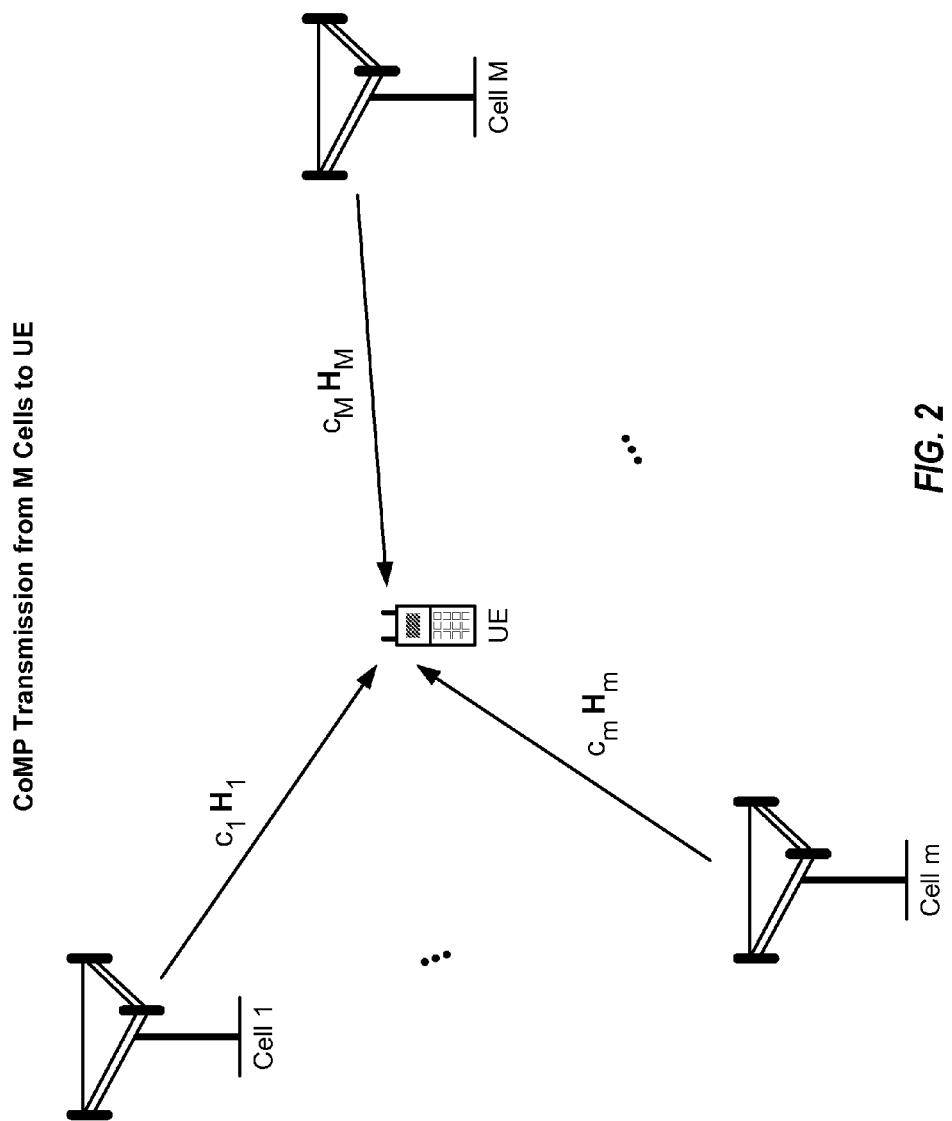
FIG. 2 shows data transmission from multiple cells to a single UE.

FIG. 2 shows an example of CoMP transmission from multiple cells to a single UE. The UE may have a measurement set, which may include all cells that can be measured by the UE and can participate in CoMP transmission to the UE. These cells may belong to the same eNB or different eNBs and may be selected based on channel gain/pathloss, received signal strength, received signal quality, etc. Received signal quality may be quantified by a signal-to-noise-and-interference ratio (SINR), a carrier-to-interference ratio (C/I), etc. For example, the measurement set may include cells with channel gain or SINR above a threshold. The UE may determine and report channel state information (CSI) for the cells in the measurement set. The UE may be served by one or more cells in a CoMP set for either multi-point transmission (joint processing) or single-point transmission (coordinated beamforming). The CoMP set may include all or some of the cells in the measurement set and may be dynamically selected without the UE's knowledge.

As shown in FIG. 2, the UE may have a different communication channel or link for each cell. The response of the channel from each cell m to the UE may be given as $c_m H_m$, where $H_m$ is a $R \times T_m$ channel matrix for cell m, $c_m$ is a long-term channel gain for cell m, $T_m$ is the number of transmit antennas at cell m, R is the number of receive antennas at the UE, and $m \in \{1, \ldots, M\}$. $H_m$ includes channel gains that represent the short-term fading between the $T_m$ transmit antennas at cell m and the R receive antennas at the UE, where in general $T_m \geq 1$ and $R \geq 1$. $c_m$ represents the long-term channel gain between cell m and the UE. There may be non-negligible differences between the long-term channel gains of different cells in the measurement set.

Each cell may transmit a cell-specific reference signal (CRS) that may be used by UEs for channel estimation. A reference signal is a signal that is known a priori by a transmitter and a receiver and may also be referred to as pilot. A CRS is a reference signal that is specific for a cell, e.g., generated based on a cell identity (ID). The UE may estimate the channel response (e.g., a channel matrix) for each cell based on the CRS from that cell.

The UE may send either explicit channel feedback (also referred to as explicit feedback) or implicit channel feedback (also referred to as implicit feedback) to support CoMP transmission. For explicit feedback, the UE may send CSI indicative of the channel responses for different cells, as observed by the UE. For implicit feedback, the UE may send CSI determined based on the channel responses for different cells possibly conditioned on specific precoding matrices.

For explicit feedback, the UE may determine and report intra-cell components for individual cells and inter-cell components across cells. The intra-cell components may capture short-term CSI between the transmit antennas of a given cell and the receive antennas of the UE. The inter-cell components may capture amplitude and phase relationship across cells. The intra-cell and inter-cell components may be used for CoMP transmission to the UE.

In one design of explicit feedback of intra-cell components, the UE may measure and report the channel matrices $H_1$ through $H_M$ for cells 1 through M, respectively. The UE may measure the channel matrix $H_m$ for each cell m and may obtain a measured channel matrix $\overline{H}_m$, which is an estimate of $H_m$. The UE may quantize the measured channel matrix $\overline{H}_m$ for each cell as follows. The measured channel matrix $\overline{H}_m$ includes R rows corresponding to R measured channel vectors $\overline{h}_m(1)$ through $\overline{h}_m(R)$ for the R receive antennas at the UE. A per-cell codebook $C_P$ may be used to quantize each row of the measured channel matrix $\overline{H}_m$ and may include a number of (N) channel vectors. Each channel vector in the codebook $C_P$ may be assigned a unique B-bit index, where $B=\lceil \log_2(N) \rceil$. Each measured channel vector in $\overline{H}_m$ may be quantized to one channel vector in the codebook $C_P$ as follows:

$$\hat{h}_m(r) = \underset{\hat{h} \in C_P}{\arg\min}\, d(\hat{h}, \overline{h}_m(r)), \text{ for } r = 1, \ldots, R, \quad \text{Eq (1)}$$

where $d(,)$ is a metric such as a normalized correlation $$d(\hat{h}, \overline{h}_m(r)) = \frac{|\hat{h}^H \overline{h}_m(r)|}{\|\hat{h}\|\|\overline{h}_m(r)\|},$$

$\overline{h}_m(r)$ is a measured channel vector corresponding to the r-th row of $\overline{H}_m$,
$\hat{h}_m(r)$ is a quantized channel vector for $\overline{h}_m(r)$, and
"H" denotes a Hermetian or conjugate transpose.

As shown in equation (1), the measured channel vector $\overline{h}_m(r)$ may be evaluated against each channel vector in the codebook $C_P$. The channel vector in the codebook $C_P$ with the best metric may be selected as the quantized channel vector $\hat{h}_m(r)$ for the measured channel vector $\overline{h}_m(r)$.

The channel vectors in the codebook $C_P$ may be defined to have unit norm (or a magnitude of 1) so that $\|\hat{h}\|=1$ for each channel vector in the codebook. In this case, the quantized channel vector $\hat{h}_m(r)$ would include channel direction information (CDI) but not amplitude information. Furthermore, if normalized correlation is used to determine the quantized channel vector, then the quantized channel vector would not include phase information.

The UE may determine relative amplitude and phase information for the M cells. An inter-cell codebook $C_\theta$ may be used to quantize the relative amplitude and phase for the M cells and may include a number of relative amplitude and phase vectors. Each relative amplitude and phase vector in the codebook $C_{74}$ may be assigned a unique index. The UE may determine the relative amplitude and phase for the M measured channel vectors for the M cells for each receive antenna at the UE, as follows:

$$v(r) = \underset{v \in C_\theta}{\arg\min}\, d(v \circ \hat{h}(r), \overline{h}(r)), \text{ for } r = 1, \ldots, R, \quad \text{Eq (2)}$$

where $\overline{h}(r) = [c_1 \overline{h}_1(r), \ldots, c_M \overline{h}_M(r)]$ is an extended vector containing M scaled measured channel vectors for the M cells for antenna r at the UE,
$\hat{h}(r) = [c_1 \hat{h}_1(r), \ldots, c_M \hat{h}_M(r)]$ is an extended vector containing scaled quantized channel vectors for the M cells for antenna r at the UE,
$v = [v_1, \ldots, v_K]$ is a vector with M relative complex gains for the M cells,
$v \circ \hat{h}(r) = [v_1 c_1 \hat{h}_1(r), \ldots, v_M c_M \hat{h}_M(r)]$, and
$v(r)$ is a relative amplitude and phase vector for antenna r at the UE.

As shown in equation (2), the measured channel vectors for antenna r in the extended vector $\overline{h}(r)$ may be evaluated against the corresponding quantized channel vectors in the extended vector $\hat{h}(r)$ for each relative amplitude and phase vector v in the codebook $C_\theta$. Each vector v includes M complex gains for the M cells, which are indicative of the relative amplitude and phase between the M cells. The relative amplitude and phase vector in the codebook $C_\theta$ with the best metric may be selected as a quantized vector of relative amplitude and phase for the M cells for antenna r. The process may be repeated for each of the R antennas at the UE (i.e., for the R rows of the measured channel matrices for the M cells) to obtain R quantized relative amplitude and phase vectors $v(1)$ through $v(R)$ for the R antennas.

The UE may report CSI comprising (i) the indices of the R quantized channel vectors $\hat{h}_m(1)$ through $\hat{h}_m(R)$ obtained for each of the M measured channel matrices for the M cells and (ii) the indices of the R quantized relative amplitude and phase vectors $v(1)$ through $v(R)$ obtained for the R rows of the measured channel matrices.

In another design of explicit feedback of intra-cell components, the UE may report one or more eigenvectors for one or more eigenmodes of the channel from each cell to the UE. The UE may perform singular value decomposition of a measured channel matrix for cell m, as follows:

$$\overline{H}_m = U_m \Sigma_m V_m^H, \text{ for } m=1, \ldots, M, \quad \text{Eq (3)}$$

where $U_m$ is a unitary matrix of left singular vectors of $\overline{H}_m$,
$V_m$ is a unitary matrix of right singular vectors of $\overline{H}_m$, and
$\Sigma_m$ is a diagonal matrix of singular values of $\overline{H}_m$.

The right singular vectors in $V_m$ are also referred to as eigenvectors. The UE may select Q best eigenvectors in $V_m$ corresponding to Q largest singular values in $\Sigma_m$, where in general $1 \leq Q \leq \min\{R, T_m\}$. In one design, the UE may evaluate the performance of different possible number of eigenvectors (i.e., different possible Q values) and may select the Q value with the best performance. In another design, the UE may be configured with a specific value of Q based on various criteria such as long-term channel conditions, the amount of data for the UE, etc. In any case, Q may be referred to as a maximum "rank" and may be indicative of the maximum number of layers or eigenmodes configured for data transmission to the UE.

In one design, the UE may quantize the Q best eigenvectors for each cell, e.g., as shown in equation (1). The UE may also determine relative amplitude and phase vectors for the Q best eigenvectors for all M cells, e.g., as shown in equation (2). The UE may report CSI comprising the indices of the quantized eigenvectors for all M cells and the indices of the relative amplitude and phase vectors.

In yet another design of explicit feedback of intra-cell components, the UE may determine an equivalent channel matrix for each cell m as follows:

$$G_m = U_1^H \overline{H}_m, \text{ for } m=1, \ldots, M, \quad \text{Eq (4)}$$

where $U_1$ is a unitary matrix of left singular vectors of $\overline{H}_1$ for a serving cell, and
$G_m$ is an equivalent channel matrix for cell m.

The UE may quantize the vectors in the equivalent channel matrix $G_m$ for each cell, e.g., as shown in equation (1). The UE may also determine relative amplitude and phase vectors for the equivalent channel matrices for all M cells, e.g., as shown in equation (2). The UE may report CSI comprising the indices of the quantized equivalent channel vectors for all M cells and the indices of the relative amplitude and phase vectors.

In one design of implicit feedback, the UE may determine precoding matrix indicator (PMI), rank indicator (RI), and/or channel quality indicator (CQI) based on the channel responses for different cells. The UE may evaluate performance (e.g., overall throughput) of different possible precoding vectors and different possible ranks and may determine the precoding vectors and rank with the best performance. The UE may also determine CQI based on the precoding vectors and rank having the best performance. The UE may then report CSI comprising the PMI, RI and/or CQI, which may be used for data transmission to the UE. The PMI, RI and/or CQI may thus provide implicit channel information.

Explicit feedback may provide better performance for CoMP transmission than implicit feedback. This is because a UE typically does not have knowledge of the channel conditions at other UEs and hence is unable to determine precoding vectors that can provide good performance (e.g., interference reduction) for the other UEs. With explicit feedback, different UEs may report channel matrices or eigenvectors for different cells. Precoding vectors may then be determined based on the reported channel matrices or eigenvectors from different UEs to obtain good performance for all affected UEs, e.g., to maximize a signal-to-leakage ratio (SLR) for each UE.

Feedback overhead for CoMP transmission may be much higher than feedback overhead for conventional transmission from one cell to one UE, without having to consider other UEs. This is because a UE may report CSI for only one serving cell for conventional transmission but may report CSI for the serving cell as well as other cells for CoMP transmission. The higher feedback overhead for CoMP transmission may result in both (i) additional uplink overhead to report CSI for multiple cells by the UE and (ii) additional signaling on the backhaul to disseminate the CSI between cells that participate in CoMP transmission to the UE.

In an aspect, CSI may be generated with scalable quantization to obtain good performance for CoMP transmission while reducing feedback overhead. For scalable quantization, a UE may quantize CSI with different granularity for different cells based on the performance impact of each cell for CoMP transmission to the UE. Errors in CSI for cells with weak channels may result in less performance degradation as compared to errors in CSI for cells with strong channels. Hence, good performance and/or lower feedback overhead may be obtained by using different quantization granularity for different cells. In particular, finer quantization (e.g., a larger codebook) may be used for cells with strong channels to obtain more accurate CSI feedback since CSI errors for these cells may have large impact on performance. Conversely, coarse quantization (e.g., a smaller codebook) may be used for cells with weak channels since relatively larger CSI errors due to less accurate CSI feedback can be tolerated for these cells.

In the description herein, a cell with a strong channel to a UE may be referred to as a strong cell, and a cell with a weak channel to the UE may be referred to as a weak cell. A cell may be deemed as a strong cell or a weak cell based on various criteria such as channel gain/pathloss, received signal strength, received signal quality, etc. For example, a cell may be deemed as (i) a strong cell if the channel gain for the cell is above a high threshold or (ii) a weak cell if the channel gain is below a low threshold. More than two categories of cells may also be defined, e.g., by using more thresholds. For example, a cell may be deemed as a very strong cell, a strong cell, a moderate cell, a weak cell, etc. For simplicity, much of the description below assumes two categories of cells - strong cells and weak cells.

A UE should report sufficiently accurate CSI in order to obtain good performance for CoMP transmission. The accuracy/fidelity of CSI feedback may be dependent on various factors, which may include one or more of the following:
  A. Feedback type—channel matrices, eigenvectors, equivalent channel matrices, precoding vectors, etc.,
  B. Channel estimation errors introduced at the UE prior to feedback,
  C. Granularity of CSI feedback in time and/or frequency domain, and
  D. Quantization of CSI.

In general, more accurate CSI feedback may be achieved by reporting CSI with finer granularity in frequency and time and by using more bits to quantize CSI, all of which may increase feedback overhead. The accuracy of CSI feedback may also be dependent on the type of CSI being reported, channel estimation errors at the UE, and/or other factors. Some of these factors may be configurable while other factors may be fixed. For example, the feedback type may be dependent on system design and may be fixed. Channel estimation errors may be dependent on the receiver processing technique employed by the UE and the signal strength of each cell and may not be configurable. The granularity of CSI feedback in the time and frequency domains may be fixed by system design or may be configurable.

The UE may quantize measured channel vectors, or equivalent channel vectors, or eigenvectors, or some other channel-related vectors. For clarity, much of the description below assumes that the UE quantizes the measured channel vectors. The UE may quantize the measured channel vectors with a particular granularity. The quantization granularity may be given by (i) the number of bits used to represent a quantized channel vector or (ii) a codebook size indicative of the number channel vectors in a codebook used for quantization. For clarity, quantization granularity is given by codebook size in much of the description below. The codebook may include N channel vectors, and each channel vector may be assigned a unique B-bit index, where $N \leq 2^B$. In general, a larger codebook with more channel vectors corresponds to finer quantization. The larger codebook may allow a measured channel vector to be quantized more accurately, which may then result in less errors between the measured channel vector and the quantized channel vector. However, the larger codebook would also result in more bits being used to convey the quantized channel vector, which would increase feedback overhead.

The UE may report CSI comprising quantized channel vectors for M cells. The CSI may be used to (i) determine which cells should coordinate to transmit data to the UE and (ii) determine precoding vectors for the selected cells, e.g., based on maximization of a signal-to-leakage ratio. However, the CSI would likely have some errors due to quantization. The CSI errors would result in a mismatch with the true channel and may lead to additional interference at the UE.

In one design, errors due to quantization may be quantified by an interference suppression ratio (ISR), which may be expressed as:

$$ISR = E_h\left[\max_{\hat{h}}\left\{-10\log_{10}\left(1 - \frac{|h^H\hat{h}|^2}{\|h\|^2\|\hat{h}\|^2}\right)\right\}\right], \quad \text{Eq (5)}$$

where E[ ] denotes an expectation operation.

In equation (5), the maximum (max) operation is over all channel vectors (or codewords) in the codebook, and the expectation operation is over an ensemble of channels. For each actual channel h, the best quantized channel vector $\hat{h}$ in the codebook with the least error is determined by the maximum operation. The process is repeated for different channels, and the errors for different channels are averaged by the expectation operation.

Interference suppression is indicative of the expected amount of errors in the quantized channel vectors. If the UE reports a quantized channel vector with no errors ($\hat{h}=h$), then a neighbor cell may select a precoding vector that is orthogonal to the quantized channel vector and would then cause no interference to the UE, thereby resulting in infinite interference suppression. However, if the quantized channel vector has errors, then the precoding vector may be orthogonal to the quantized channel vector but not the actual channel vector, and the neighbor cell may cause some interference to the UE. In general, more errors in the quantized channel vectors may result in more interference to the UE from the neighbor cell, and hence less interference suppression. Increasing the size of the codebook may decrease errors in the quantized channel vectors, which may then increase interference suppression.

Figure 3:
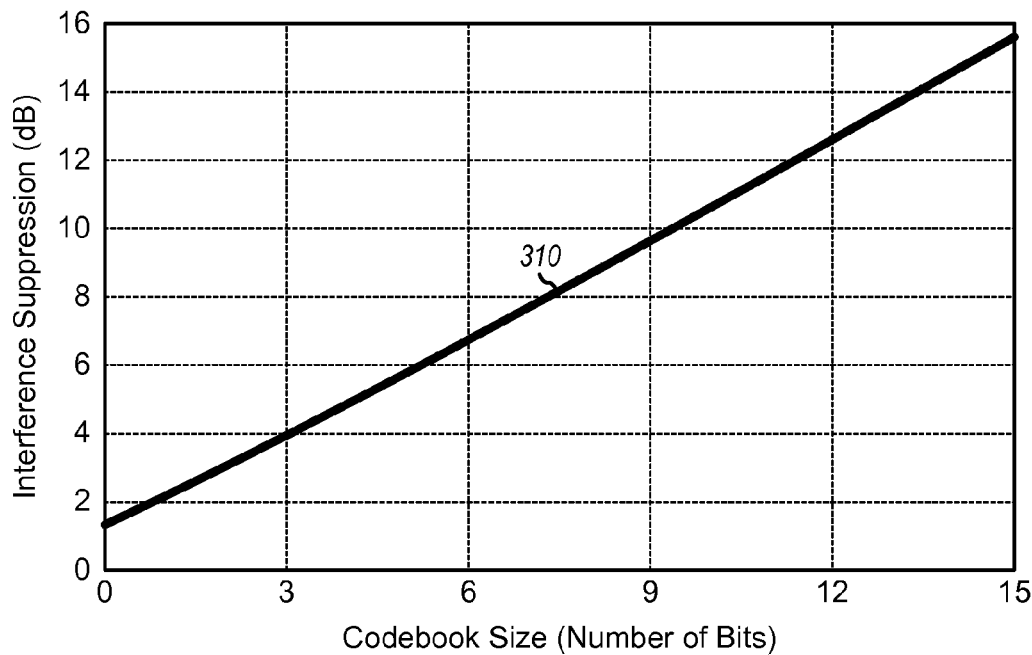
FIG. 3 shows a plot of interference suppression versus codebook size.

FIG. 3 shows a plot of interference suppression versus codebook size. The horizontal axis represents the codebook size and is given in number of bits (B). The vertical axis represents interference suppression and is given in units of decibel (dB). A plot 310 shows interference suppression as a function of codebook size. As shown in FIG. 3, interference suppression may increase linearly with codebook size.

A suitable codebook size may be selected for a cell based on various criteria. In one design, the codebook size may be selected based on residual interference at the UE. The residual interference may include interference from all cells not involved in CoMP transmission to the UE as well as thermal noise. The residual interference may be estimated based on reference signals from the cells. The codebook size may be selected such that the impact of CSI errors may be balanced with the amount of residual interference at the UE. A given amount of CSI errors may result in (i) more additional interference and a larger performance impact when associated with a strong cell and (ii) less additional interference and a smaller performance impact when associated with a weak cell. Hence, finer quantization may be used for strong cells whose CSI errors have more impact on performance, so that the additional interference due to CSI errors for these cells can be reduced to a level near the residual interference. Conversely, coarse quantization may be used for weak cells whose CSI errors have less impact of performance, so that the additional interference due to CSI errors for these cells is near the level of residual interference. Each cell may thus be associated with a suitable codebook size such that the additional interference due to the CSI errors for that cell is near the level of residual interference. This may result in better performance and/or less feedback overhead over a conventional scheme in which all cells have the same codebook size and hence approximately equal CSI errors, which would then result in strong cells causing more additional interference and having larger performance impact.

In one design, the codebook size may be selected such that the additional interference due to CSI errors from quantization may be balanced with the residual interference at the UE. This may be achieved by selecting the codebook size such that the following condition is satisfied:

$$ISR_m \geq \underbrace{10\log_{10}\left(\frac{P_{RX,m}}{I_{RES}}\right)}_{ISR_{target,m}}, \quad \text{Eq (6)}$$

where $P_{RX,m}$ is the received power for cell m at the UE,
$I_{RES}$ is the residual interference at the UE, and
$ISR_m$ is the interference suppression ratio for cell m.

The receive power for cell m may be dependent on the long-term channel gain for cell m, or $P_{RX,m} \propto c_m^2$.

In another design, the codebook size may be selected such that degradation in SINR due to quantization may be limited to a target level. In particular, it may be desirable to ensure that the ratio of SINR without quantization to SINR with quantization is at least γ (in linear scale), where γ≥1. This may be achieved by selecting the codebook size such that the following condition is satisfied:

$$ISR_m \geq \underbrace{10\log_{10}\left(\frac{P_{RX,m}}{I_{RES}}\right) + 10\log_{10}\left(\frac{M}{\gamma-1}\right) - 10\log_{10}\left(\frac{\sum_m \frac{P_{RX,m}}{I_{RES}}}{\sum_m \frac{P_{RX,m}}{I_{RES}} + \gamma}\right)}_{ISR_{target,m}}. \quad \text{Eq (7)}$$

In equation (7), the quantity to the right of the inequality sign may be considered as a target ISR for cell m. The first term to the right of the inequality sign ensures that the additional interference due to quantization is balanced with the residual interference at the UE. The second term to the right of the inequality sign ensures that SINR degradation with quantization is limited to a target level. The third term to the right of the inequality sign is a correction factor.

Figure 4:
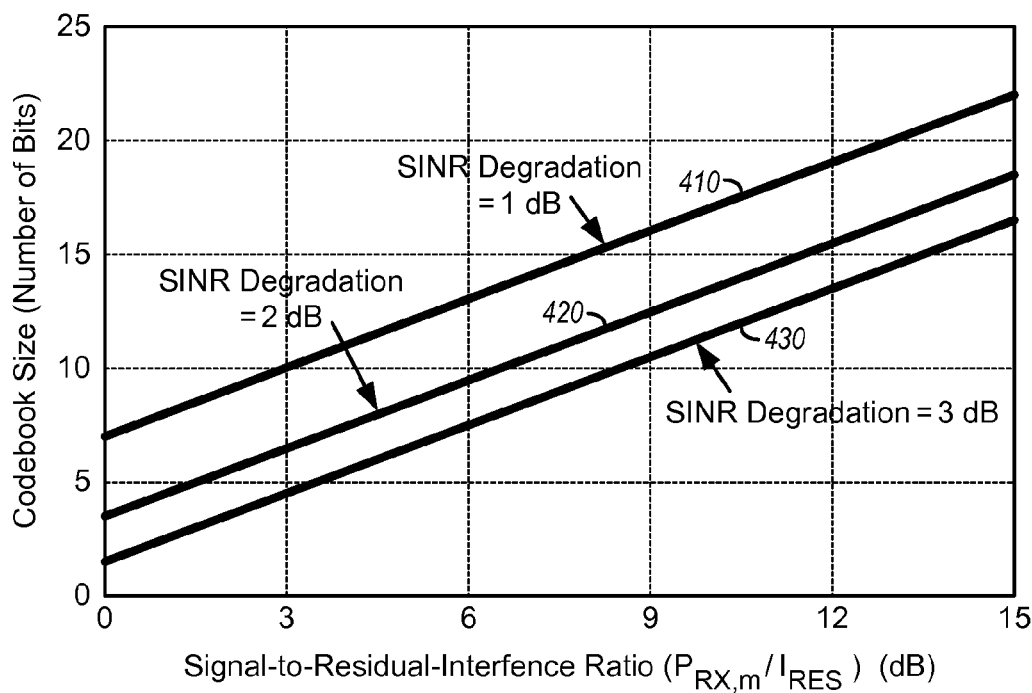
FIG. 4 shows plots of codebook size versus signal-to-residual-interference ratio.

FIG. 4 shows plots of codebook size versus signal-to-residual-interference ratio ($P_{RX,m}/I_{RES}$). The horizontal axis represents $P_{RX,m}/I_{RES}$ and is given in units of dB. The vertical axis represents the codebook size and is given in number of bits (B). A plot 410 shows codebook size versus $P_{RX,m}/I_{RES}$ to obtain SINR degradation of 1 dB (or γ=1 dB). A plot 420 shows codebook size versus $P_{RX,m}$ ARES to obtain SINR degradation of 2 dB. A plot 430 shows codebook size versus $P_{RX,m}/I_{RES}$ to obtain SINR degradation of 3 dB. The plots in FIG. 4 are obtained based on the first two terms to the right of the inequality sign in equation (7) for a case of one cell (or M=1). Including the third term would increase the codebook size by a small amount. For every doubling of M, the interference suppression increases by 3 dB, and a larger codebook is needed. As shown in FIG. 4, for a given $P_{RX,m}/I_{RES}$, a progressively larger codebook (or finer quantization with more bits) is needed to obtain progressively less SINR degradation.

In yet another design, the codebook size may be selected based on the long-term channel gains of the cells. In one design, the measured channel vectors for a designated cell may be quantized based on a predetermined number of bits, $B_{REF}$. The designated cell may be a serving cell, or a strongest cell, or some other cell. The measured channel vectors for each remaining cell may be quantized based on a variable number of bits, which may be expressed as:

$$B_m = B_{REF} - \kappa \cdot \Delta c_m, \quad \text{Eq (8)}$$

where $\Delta c_m = 10 \log_{10}(c_{REF}/c_m)$ is the difference between the long-term channel gain of the designated cell and the long-term channel gain of cell m (in dB),
κ is a scaling factor used to select the codebook size, and
$B_m$ is the number of bits for quantization for cell m.

In the design shown in equation (8), the number of bits for quantization for cell m may be dependent on the long-term channel gain of cell m relative to the long-term channel gain of the designated cell. The measured channel vectors for a cell that is $\Delta c_m$ dB weaker than the designated cell may be quantized using $\kappa \cdot \Delta c_m$ fewer bits than the $B_{REF}$ bits used for the measured channel vectors of the designated cell. The scaling factor κ may be selected to obtain good performance while reducing feedback overhead.

The performance of data transmission with scalable quantization versus fixed quantization was simulated. In the simulation, the average spectral efficiency for different amount of feedback overhead was determined for three quantization schemes, which include the two quantization schemes shown in equations (7) and (8) and a fixed quantization scheme with the same number of quantization bits (B) for all cells. For fair comparison, the two quantization schemes in equations (7) and (8) are limited to B bits or fewer.

Figure 5:
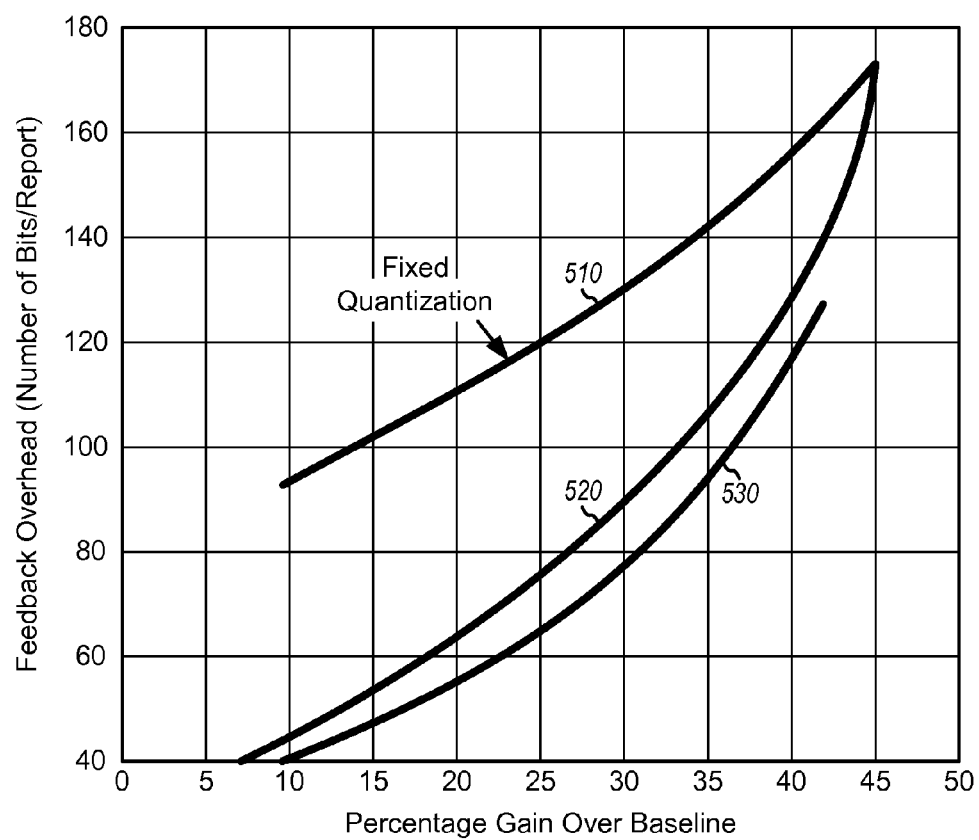
FIG. 5 shows performance versus feedback overhead for three quantization schemes.

FIG. 5 shows the results of the simulation for scalable quantization. The horizontal axis represents the improvement in average spectral efficiency over a conventional transmission from one cell to one UE. The vertical axis represents the number of bits for a CSI report, which is dependent on the number of bits used to represent each quantized channel vector. A plot 510 shows performance for the fixed quantization scheme. A plot 520 shows performance for the quantization scheme shown in equation (8). A plot 530 shows performance for the quantization scheme shown in equation (7). As can be observed from FIG. 5, the quantization scheme in equation (7) may (i) provide better performance (e.g., higher spectral efficiency) over the other two quantization schemes for a given amount of feedback overhead and/or (ii) result in less feedback overhead over the other two quantization schemes for a given performance. For example, the quantization scheme in equation (7) may provide appropriately 40% reduction in feedback overhead while preserving approximately 30% gain in average spectral efficiency over the fixed quantization scheme. The results in FIG. 5 are for joint processing. Similar reduction in feedback overhead and/or improvement in performance may also be obtained for other types of CoMP transmission such as coordinated beamforming.

As shown in FIG. 5, scalable quantization with larger codebooks for strong cells and smaller codebooks for weak cells may improve performance and/or reduce feedback overhead in comparison to a conventional scheme of using the same codebook for all cells. Since the long-term channel gains of different cells may vary widely, significant reduction in feedback overhead may be achieved by using smaller codebooks for weak cells. Furthermore, the codebook size may be selected based on the long-term channel gains of the cells and the residual interference at the UE to reduce degradation of SINR at the UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are transmitted in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900 or 1200 for system bandwidth of 1.4, 3, 5, 10, 15 or 20 megahertz (MHz), respectively. A number of subbands may be defined, and each subband may include a number of subcarriers. For a given total number of subcarriers, the number of subbands may be inversely related to the subband size. The subband size is given by the number of subcarriers in each subband.

In another aspect, scalable channel feedback may be performed to determine a codebook size and a subband size for reporting CSI for each cell. The subband size may be indicative of granularity in frequency for CSI reporting. More accurate CSI feedback may be achieved by quantizing CSI with more bits using a larger codebook and reporting CSI with finer granularity in frequency with a smaller subband size, both of which would increase feedback overhead. The codebook size and the subband size may be determined to obtain good performance while reducing feedback overhead.

The SINR at the UE for multi-point transmission with joint processing may be expressed as:

$$SINR = \frac{\left|\sum_{m=1}^{M} c_m h_m^H w_{m1}\right|^2}{I_{RES} + \sum_{p=2}^{P} \left|\sum_{m=1}^{M} c_m h_m^H w_{mp}\right|^2}, \quad \text{Eq (9)}$$

where $w_{m1}$ is a precoding vector used by cell m for packet 1 sent to the UE, $w_{mp}$ is a precoding vector used by cell m for packet p sent to another UE, and P is the number of packets transmitted by each cell.

The SINR may be degraded by various factors such as channel estimation errors, frequency interpolation errors, and quantization errors. The channel estimation and interpolation errors may be modeled as follows:

$$h_m = \bar{h}_m + e_m, \quad \text{Eq (10)}$$

where $\bar{h}_m$ is a measured channel vector for cell m, $h_m$ is an actual channel vector for cell m, and $e_m$ is an error vector due to channel estimation and interpolation across frequency.

The channel estimation and interpolation errors may be assumed to be additive white Gaussian noise (AWGN) with $E\{e_m^H e_m\} = \sigma_m^2 I$, where $\sigma_m^2$ is the variance of the channel estimation and interpolation errors for cell m, and $\sigma_m^2 < 1$ for all cells.

The quantization errors result from quantizing the measured channel vector for cell m with $B_m$ bits. The accuracy of quantization may be given as follows:

$$\alpha_m = \frac{\bar{h}_m \hat{h}_m^H}{\|\bar{h}_m\| \|\hat{h}_m\|}, \quad \text{Eq (11)}$$

where $\hat{h}_m$ is a quantized channel vector for cell m, and $\alpha_m$ is a normalized correlation between the channel vector and its quantized version and is indicative of the quantization accuracy for cell m.

The variance of the quantization errors, $\sigma_{m,q}^2$, may be expressed as:

$$\sigma_{m,q}^2 = E\{1 - |\alpha_m|^2\}. \quad \text{Eq (12)}$$

The interference suppression ratio (ISR) may be defined based on the variance $\sigma_{m,q}^2$, as follows:

$$ISR_m = -10 \log_{10}(\sigma_{m,q}^2). \quad \text{Eq (13)}$$

The average SINR at the UE may then be expressed as:

$$SINR_{avg} \approx \frac{\sum_{m=1}^{M} T_m c_m - \sum_{m=1}^{M} T_m c_m (\sigma_{m,q}^2 + \sigma_m^2)}{I_{RES} + \sum_{m=1}^{M} c_m (\sigma_{m,q}^2 + \sigma_m^2)}. \quad \text{Eq (14)}$$

The variance of the channel estimation and interpolation errors may be decomposed as follows:

$$\sigma_m^2 = \sigma_{m,f}^2 + \sigma_{m,e}^2, \quad (15)$$

where $\sigma_{m,e}^2$ is the variance of the channel estimation errors, and $\sigma_{m,f}^2$ is the variance of the errors due to interpolation across frequency.

The frequency interpolation errors may be due to averaging a channel over all subcarriers in a subband and may be dependent on the subband size. The channel estimation errors may be independent of the subband size but may be dependent on the SINR of the channel for each cell. The variance $\sigma_{m,q}^2$ may be a function of the codebook size. The variance $\sigma_{m,f}^2$ may be a function of the subband size.

In one design, the codebook size and the subband size may be determined such that the degradation in the average SINR is no more than γ, which may be expressed as:

$$SINR_{avg} \geq \frac{1}{\gamma} \cdot \underbrace{\frac{\sum_{m=1}^{M} T_m c_m - \sum_{m=1}^{M} T_m c_m \sigma_{m,e}^2}{I_{RES} + \sum_{m=1}^{M} c_m \sigma_{m,e}^2}}_{\text{SINR with no quantization or frequency interpolation errors}}, \quad \text{Eq (16)}$$

where γ>1. The SINR with no quantization or frequency interpolation errors in equation (16) may be obtained based on equation (14) with $\sigma_{m,q}^2 = 0$.

The average SINR in the left hand side of equation (16) may be replaced with the expression in the right hand side of equation (14). The condition in equation (16) may then be expressed as:

$$\sum_{m=1}^{M} \underbrace{c_m (\sigma_{m,q}^2 + \sigma_{m,f}^2)}_{\text{additional interference from cell } m} \leq \tilde{I}_{RES} \cdot (\gamma - 1) \cdot \frac{\sum_{m=1}^{M} \frac{\tilde{c}_m}{\tilde{I}_{RES}}}{\sum_{m=1}^{M} \frac{\tilde{c}_m}{\tilde{I}_{RES}} + \gamma}, \quad \text{Eq (17)}$$

where $$\tilde{I}_{RES} = I_{RES} + \sum_{m=1}^{M} c_m \sigma_{m,e}^2, \quad \text{Eq (18)}$$

and $$\tilde{c}_m = c_m (1 - \sigma_{m,e}^2). \quad \text{Eq (19)}$$

In one design, plots of the variance $\sigma_{m,q}^2$ versus codebook size may be determined for different SINRs (e.g., via computer simulation or empirical measurement) and stored in a look-up table. Similarly, plots of the variance $\sigma_{m,f}^2$ versus subband size may be determined for different amounts of interference suppression (e.g., via computer simulation or empirical measurement) and stored in a look-up table. For each cell m, the look-up tables may be accessed to determine the variances $\sigma_{m,q}^2$ and $\sigma_{m,f}^2$ for different possible combinations of SINR and subband size for cell m. The variances $\sigma_{m,q}^2$ and $\sigma_{m,f}^2$ may then be used to test the condition shown in equation (16) or (17). The combination of codebook size and subband size with the lowest feedback overhead that satisfies the condition may be selected for use for cell m.

In another design, the variances $\sigma_{m,q}^2$ and $\sigma_{m,f}^2$ may be modeled with exponential functions, as follows:

$$\sigma_{m,q}^2 = 10^{\frac{-a \cdot B_m - \phi}{10}}, \quad \text{Eq (20)}$$

and $$\sigma_{m,f}^2 = 10^{\frac{-\theta \cdot S_m - \phi}{10}} + \beta_m, \quad \text{Eq (21)}$$

where $B_m$ is the number of quantization bits for cell m, $S_m$ is the number of subbands for cell m, $\beta_m$ is an error floor for cell m, which may be defined by interpolation errors with each subband including one subcarrier, and a, φ and θ are constants used for curve fitting, e.g., a=2.0, φ=1.0, and θ=0.4.

In one design, the codebook sizes and the subband sizes for all M cells may be determined jointly based on the following criteria:

$$\min \sum_{m=1}^{M} B_m S_m, \quad \text{Eq (22)}$$

subject to $$\sum_{m=1}^{M} c_m (\sigma_{m,q}^2 + \sigma_{m,f}^2) \leq \eta \cdot \tilde{I}_{RES}, \quad \text{Eq (23)}$$

where $B_m S_m$ is the feedback overhead for cell m, and

η is equal to the quantity on the right hand side of the inequality sign in equation (17) but excluding $\tilde{I}_{RES}$.

In the design shown in equations (22) and (23), the codebook sizes and the subband sizes for all M cells may be determined jointly by evaluating different possible combinations of codebook sizes and subband sizes for all cells. For each possible combination, the total feedback overhead may be determined as shown by the summation in equation (22), and the interference criterion in equation (23) may be evaluated. The combination with the lowest total feedback overhead that also satisfies the interference criterion in equation (23) may be selected for use.

In another design, the codebook size and the subband size for each cell may be determined jointly as follows:

$$\min(B_m S_m), \text{ subject to} \quad \text{Eq (24)}$$

$$c_m(\sigma_{m,q}^2 + \sigma_{m,f}^2) \leq f_m(I_{RES}, \eta), \quad \text{Eq (25)}$$

where $f_m(I_{RES}, \eta)$ is a function of $I_{RES}$ and η for cell m, e.g., $$f_m(I_{RES}, \eta) = \frac{\eta \cdot I_{RES}}{M}.$$

In the design shown in equations (24) and (25), the codebook size and the subband size for each cell m may be determined jointly by evaluating different possible combinations of codebook size $B_m$ and subband size $S_m$ for cell m. For each possible combination, the feedback overhead may be determined as shown in equation (24), and the interference criterion in equation (25) may be evaluated. The combination with the lowest feedback overhead that also satisfies the interference criterion for cell m may be selected for use.

The codebook size and the subband size for each cell or for all M cells may be determined jointly in various manners. In one design, different combinations of codebook size and subband size may be evaluated, and the combination with the lowest feedback overhead while satisfying the interference criterion may be selected. Different combinations of codebook size and subband size may be selected in a predetermined order or a pseudo-random order for evaluation.

In another design, the codebook size and the subband size may be determined jointly based on an alternate minimization algorithm. For this algorithm, a first variable (e.g., the codebook size) may be fixed at an initial value, and a second variable (e.g., the subband size) may be varied. The value of the second variable that provides the lowest feedback overhead while satisfying the interference criterion may be selected. Next, the second variable may be fixed at the selected value, and the first variable may be varied. The value of the first variable that provides the lowest feedback overhead while satisfying the interference criterion may be selected. The process may be repeated until the first and second variables are stable.

In yet another aspect, scalable channel feedback may be performed to determine a codebook size and a reporting interval for reporting CSI for each cell. The reporting interval may be indicative of granularity in time for CSI reporting. More accurate CSI feedback may be achieved by quantizing CSI with more bits using a larger codebook and reporting CSI more frequently in time with a shorter reporting interval, both of which would increase feedback overhead. The codebook size and reporting interval may be determined to obtain good performance while reducing feedback overhead. The description above for determining the codebook sizes and subband sizes for different cells may also be used to determine the codebook sizes and reporting intervals for different cells. In this case, the variance of the errors due to interpolation across frequency ($\sigma_{m,f}^2$) may be replaced with the variance of the errors due to interpolation across time ($\sigma_{m,t}^2$) in the description above. For example, the additional interference from cell m in equation (17) may be expressed as $c_m(\sigma_{m,q}^2+\sigma_{m,t}^2)$. The codebook sizes and the reporting intervals for all M cells may then be determined as described above.

In still yet another aspect, scalable channel feedback may be performed to determine a codebook size, a subband size, and a reporting interval for reporting CSI for each cell. More accurate CSI feedback may be achieved by quantizing CSI with more bits using a larger codebook and reporting CSI with finer granularity in frequency with a smaller subband size and more frequently in time with a shorter reporting interval, all of which would increase feedback overhead. The codebook size, subband size, and reporting interval may be determined to obtain good performance while reducing feedback overhead. The description above for determining the codebook sizes and subband sizes for different cells may also be used to determine the codebook sizes, subband sizes, and reporting intervals for different cells. In this case, the variance of the errors due to interpolation across frequency ($\sigma_{m,f}^2$) may be supplemented (instead of replaced) with the variance of the errors due to interpolation across time ($\sigma_{m,t}^2$) in the description above. For example, the additional interference from cell m in equation (17) may be expressed as $c_m(\sigma_{m,q}^2+\sigma_{m,f}^2+\sigma_{m,t}^2)$. The codebook sizes, the subband sizes, and the reporting intervals for all M cells may then be determined as described above.

Figure 6:
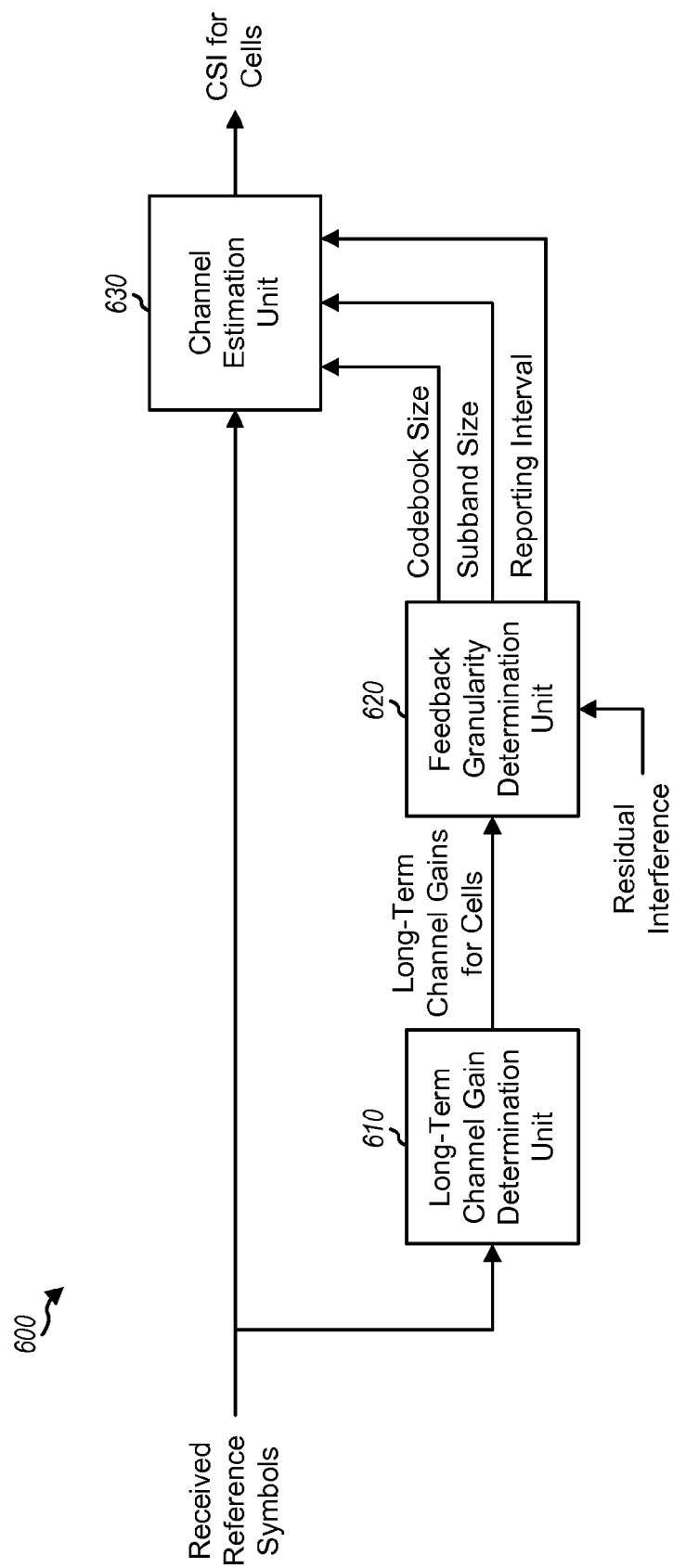
FIG. 6 shows an exemplary channel processor.

FIG. 6 shows a block diagram of a design of a channel processor 600 for scalable channel feedback. Channel processor 600 may be part of a UE or some other entity. Within channel processor 600, a unit 610 may determine long-term channel gains of different cells in a measurement set based on received reference symbols and/or other received symbols. A unit 620 may obtain the long-term channel gains for different cells from unit 610 and the residual interference at the UE and may determine the codebook size, or the subband size, or the reporting interval, or some other scalable feedback parameter, or a combination thereof for each cell, as described above. A unit 630 may perform channel estimation based on the received reference symbols and may generate CSI for each cell based on the codebook size, the subband size, and/or other scalable feedback parameters for the cell.

FIG. 7 shows a design of a process 700 for reporting CSI with scalable channel feedback. Process 700 may be performed by a UE (as described below) or by some other entity. The UE may determine granularity of quantization of CSI for each of a plurality of cells (block 712). The granularity of quantization for each cell may be selected (e.g., by the UE, or a serving cell, or some other network entity) based on at least one parameter of the cell affecting performance of data transmission to the UE. In one design, the CSI for each cell may comprise at least one channel vector, or at least one equivalent channel vector, or at least one eigenvector, or a combination thereof. In one design, the at least one parameter of each cell may comprise a long-term channel gain between the cell and the UE, or received power of the cell at the UE, or received signal quality, or some other parameter, or a combination thereof. The UE may quantize the CSI for each cell based on the granularity of quantization determined for the cell (block 714). The UE may report the CSI for each of the plurality of cells (block 716).

In one design of block 712, the UE may determine a codebook size for each of the plurality of cells. The codebook size for each cell may be selected (e.g., by the UE or some other entity) based on the at least one parameter for the cell. The UE may then quantize the CSI for each cell based on a codebook of the codebook size determined for the cell.

In one design of selecting the codebook size, a target interference suppression for each cell may be determined based on a long-term channel gain or received power for the cell at the UE, e.g., as shown in equation (6) or (7). The target interference suppression for each cell may be determined based further on the residual interference at the UE, or a target degradation in received signal quality at the UE due to quantization, or some other factor, or a combination thereof, e.g., as shown in equation (7). The codebook size for each cell may then be determined based on the target interference suppression for the cell, e.g., using a function or a look-up table of codebook size versus interference suppression.

In another design of selecting the codebook size, the number of quantization bits for each cell may be determined based on a long-term channel gain for the cell, a long-term channel gain for a designated cell (e.g., the serving cell), and the number of quantization bits for the designated cell, e.g., as shown in equation (8).

In one design, the UE may determine a subband size for feedback of CSI for each of the plurality of cells. The subband size for each cell may be selected (e.g., by the UE or some other entity) based on the at least one parameter of the cell. The UE may generate the CSI for each cell based on the subband size for the cell. In another design, the UE may determine a reporting interval for feedback of CSI for each of the plurality of cells. The reporting interval for each cell may be selected (e.g., by the UE or some other entity) based on the at least one parameter of the cell. The UE may generate the CSI for each cell based on the reporting interval for the cell. In yet another design, the UE may determine a subband size and a reporting interval for feedback of CSI for each of the plurality of cells. The subband size and the reporting interval for each cell may be selected (e.g., by the UE or some other entity) based on the at least one parameter of the cell. The UE may generate the CSI for each cell based on the subband size and the reporting interval for the cell.

In one design, the codebook size, the subband size, and/or the reporting interval may be determined separately for each cell. In another design, the codebook size, the subband size, and/or the reporting interval may be determined jointly for one cell at a time or for all of the plurality of cells.

In one design, the codebook size, the subband size, and/or the reporting interval may be determined jointly based on at least one criterion to reduce feedback overhead and reduce additional interference due to errors in the reported CSI. To determine the additional interference from each cell, the variance of errors due to quantization for each cell may be determined based on the codebook size for the cell, e.g., with a look-up table or a function of codebook size. The variance of errors due to interpolation in frequency and/or time for each cell may be determined based on the subband size and/or the reporting interval for the cell, e.g., with a look-up table or a function of subband size and/or reporting interval. The additional interference from each cell may then be determined based on the variance of errors due to quantization for the cell, the variance of errors due to interpolation in frequency and/or time for the cell, and a long-term channel gain for the cell, e.g., as shown in equation (17). The feedback overhead for each cell may be determined based on the codebook size, the subband size, and/or the reporting interval for the cell, e.g., as shown in equation (22).

In one design, the codebook size, the subband size, and/or the reporting interval may be jointly determined by evaluating different possible combinations of codebook size, subband size, and/or reporting interval. In another design, the codebook size, the subband size, and/or the reporting interval may be jointly determined by alternatively (i) fixing the codebook size and varying each of the subband size and/or the reporting interval and (ii) fixing the subband size and/or the reporting interval and varying the codebook size. In one design, the codebook size, the subband size, and/or the reporting interval may be determined jointly for all of the plurality of cells based on at least one criterion to reduce total feedback overhead for all cells and to reduce the total additional interference due to errors in the CSI for all cells, e.g., as shown in equations (22) and (23). In another design, the codebook size, the subband size, and/or the reporting interval may be determined jointly for each cell based on at least one criterion to reduce feedback overhead for the cell and to reduce the additional interference due to errors in the CSI for the cell, e.g., as shown in equations (24) and (25).

The UE may receive data transmission sent by at least one cell based on the reported CSI (block 718). In one design, the UE may receive data transmission from a set of cells among the plurality of cells, e.g., for CoMP transmission with joint processing. The data transmission may be sent based on the reported CSI for the set of cells. In another design, the UE may receive data transmission from a cell among the plurality of cells, e.g., for CoMP transmission with coordinated beamforming. The data transmission may be sent based on at least one precoding vector determined based on the reported CSI for the plurality of cells.

FIG. 8 shows a design of an apparatus 800 for reporting CSI with scalable channel feedback. Apparatus 800 includes a module 812 to determine granularity of quantization of CSI for each of a plurality of cells, the granularity of quantization for each cell being selected based on at least one parameter of the cell affecting performance of data transmission to a UE, a module 814 to quantize the CSI for each of the plurality of cells based on the granularity of quantization determined for the cell, a module 816 to report the CSI for each of the plurality of cells, and a module 818 to receive data transmission sent by at least one cell based on the reported CSI.

FIG. 9 shows a design of a process 900 for receiving CSI sent with scalable channel feedback. Process 900 may be performed by a cell (as described below) or by some other entity. The cell may be one of a plurality of cells that can transmit data to a UE and may receive CSI for the cell from the UE (block 912). The CSI for the cell may be quantized by the UE in accordance with granularity of quantization selected for the cell based on at least one parameter of the cell affecting performance of data transmission to the UE. In one design, the at least one parameter of the cell may comprise a long-term channel gain between the cell and the UE, or received power of the cell at the UE, or received signal quality, and/or some other parameter. The cell may send data transmission to the UE based on the received CSI (block 914). The data transmission may be sent by at least one cell among the plurality of cells, with the at least one cell including the cell.

In one design, the cell may determine a codebook size selected for the cell based on the at least one parameter of the cell. The cell may obtain at least one channel vector, or at least one equivalent channel vector, or at least one eigenvector for the cell based on the CSI for the cell and a codebook of the codebook size selected for the cell.

In one design, the cell may determine a subband size selected for the cell based on the at least one parameter of the cell. The cell may obtain at least one channel vector, or at least one equivalent channel vector, or at least one eigenvector for at least one subband of the subband size selected for the cell. In another design, the cell may determine a reporting interval selected for the cell based on the at least one parameter of the cell. The cell may receive the CSI for the cell sent by the UE based on the reporting interval for the cell. In yet another design, the cell may determine a subband size and a reporting interval selected for the cell based on the at least one parameter of the cell. The cell may receive the CSI for the cell sent by the UE based on the subband size and the reporting interval for the cell.

In one design, the codebook size, the subband size, and/or the reporting interval for the cell may be determined separately. In another design, the codebook size, the subband size, and/or the reporting interval for the cell may be determined jointly, e.g., for one cell at a time or for all of the plurality of cells.

In one design, for CoMP transmission with joint processing, the at least one cell may include a set of cells among the plurality of cells. Precoding vectors for the set of cells may be determined based on the CSI reported by the UE for the set of cells. The data transmission may be sent by the set of cells to the UE based on the precoding vectors.

In another design, for CoMP transmission with coordinated beamforming, the at least one cell may include only the cell. At least one precoding vector may be determined based on the CSI reported by the UE for the plurality of cells. Data transmission may be sent by the cell to the UE based on the at least one precoding vector to steer the data transmission toward the UE and away from at least one UE served by at least one other cell in the plurality of cells.

FIG. 10 shows a design of an apparatus 1000 for receiving CSI sent with scalable channel feedback. Apparatus 1000 includes a module 1012 to receive CSI for a cell among a plurality of cells, the CSI for the cell being quantized by a UE in accordance with granularity of quantization selected for the cell based on at least one parameter of the cell affecting performance of data transmission to the UE, and a module 1014 to send data transmission from the cell to the UE based on the received CSI, the data transmission being sent by at least one cell among the plurality of cells, the at least one cell including the cell.

The modules in FIGS. 8 and 10 may comprise processors, electronic devices, hardware devices, electronic components, logical circuits, memories, software codes, firmware codes, etc., or any combination thereof.

Figure 11:
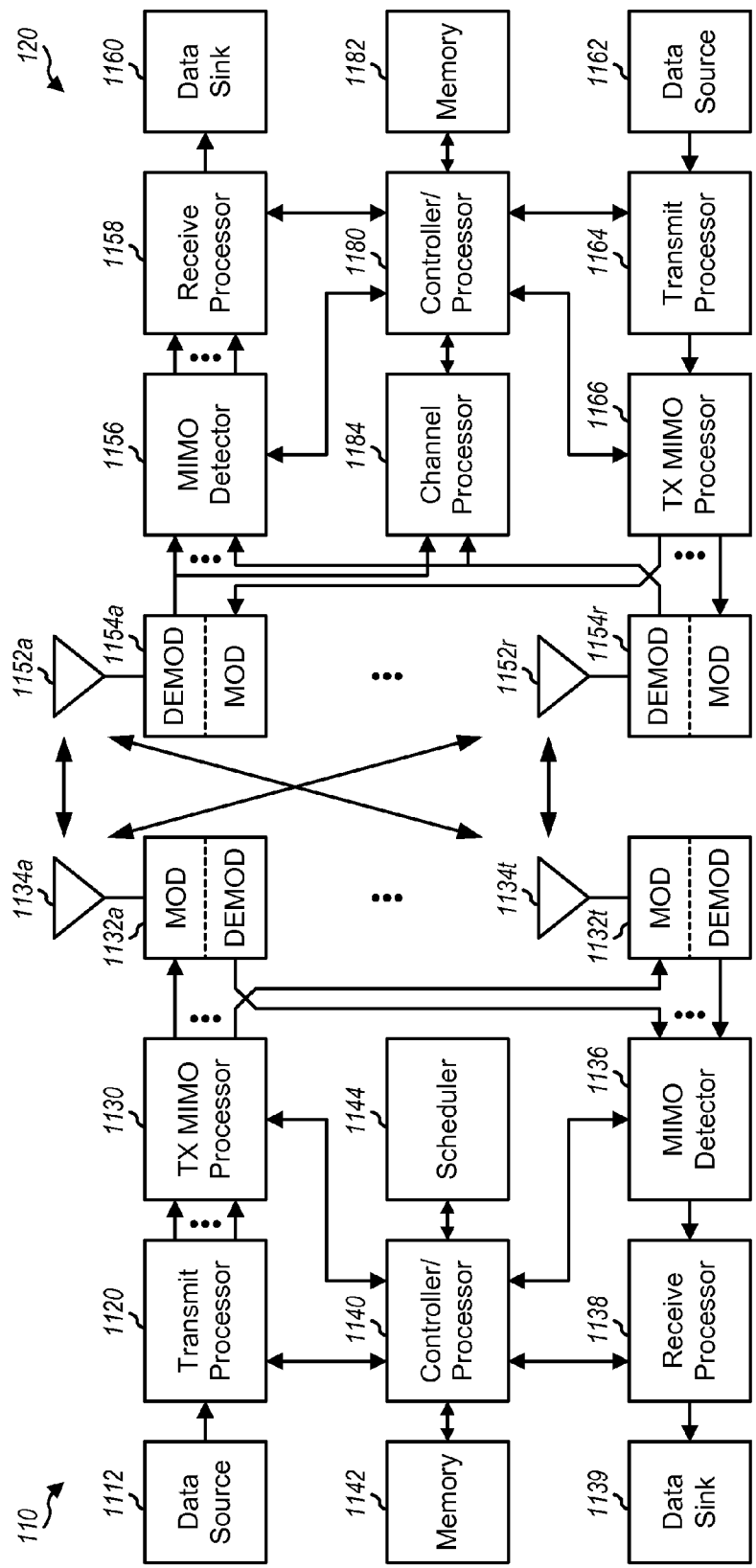
FIG. 11 shows a block diagram of a base station and a UE.

FIG. 11 shows a block diagram of a design of a base station/eNB 110 and a UE 120, which may be one of the base stations/eNBs and one of the UEs in FIG. 1. Base station 110 may serve one or more cells and may be equipped with T antennas 1134a through 1134t, where T≥1. UE 120 may be equipped with R antennas 1152a through 1152r, where R≥1.

At base station 110, a transmit processor 1120 may receive data for one or more UEs from a data source 1112, process the data for each UE based on one or more modulation and coding schemes, and provide data symbols for all UEs. Processor 1120 may also receive and process control information from a controller/processor 1140 and provide control symbols. Processor 1120 may also generate reference symbols for one or more reference signals. A transmit (TX) MIMO processor 1130 may perform precoding on the data symbols, the control symbols, and/or the reference symbols, if applicable, and may provide T output symbol streams to T modulators (MODs) 1132a through 1132t. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At UE 120, antennas 1152a through 1152r may receive the downlink signals from base station 110 and other base stations and may provide received signals to demodulators (DE-MODs) 1154a through 1154r, respectively. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate and decode) the detected symbols, provide decoded data for UE 120 to a data sink 1160, and provide decoded control information to a controller/processor 1180.

On the uplink, at UE 120, a transmit processor 1164 may receive data from a data source 1162 and control information (e.g., CSI) from controller/processor 1180. Processor 1164 may process (e.g., encode and modulate) the data and control information to obtain data symbols and control symbols, respectively. Processor 1164 may also generate reference symbols for one or more reference signals. The symbols from transmit processor 1164 may be precoded by a TX MIMO processor 1166 if applicable, further processed by modulators 1154a through 1154v (e.g., for SC-FDM, OFDM, etc.), and transmitted to base station 110 and possibly other base stations. At base station 110, the uplink signals from UE 120 and other UEs may be received by antennas 1134, processed by demodulators 1132, detected by a MIMO detector 1136 if applicable, and further processed by a receive processor 1138 to obtain decoded data and control information sent by UE 120 and other UEs. Processor 1138 may provide the decoded data to a data sink 1139 and the decoded control information to controller/processor 1140.

For scalable channel feedback, a channel processor 1184 at UE 120 may estimate the channel response (e.g., channel matrices) for each cell in a measurement set for UE 120. Processor 1180 and/or 1184 may determine CSI for each cell based on the estimated channel response for that cell, e.g., as described above. Processor 1180 and/or 1184 may implement channel processor 600 in FIG. 6.

Controllers/processors 1140 and 1180 may direct the operation at base station 110 and UE 120, respectively. Processor 1140 and/or other processors and modules at base station 110 may perform or direct process 900 in FIG. 9 and/or other processes for the techniques described herein. Processor 1180 and/or other processors and modules at UE 120 may perform or direct process 700 in FIG. 7 and/or other processes for the techniques described herein. Memories 1142 and 1182 may store data and program codes for base station 110 and UE 120, respectively. A scheduler 1144 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
jointly determining granularity of quantization of channel state information (CSI) for each of a plurality of cells, the granularity of quantization for each cell being determined, along with the granularities of quantization for the other cells of the plurality of cells, based at least in part on a joint interference criterion of data transmissions from the plurality of cells to a user equipment (UE);
quantizing the CSI for each respective cell of the plurality of cells based on the granularity of quantization jointly determined for the respective cell; and
reporting the CSI for the plurality of cells.

2. The method of claim 1, wherein the granularity of quantization for each cell is further determined based on at least one parameter of each cell affecting performance of data transmissions from the plurality of cells to the UE, wherein the at least one parameter of each cell comprises a long-term channel gain between the cell and the UE, or received power of the cell at the UE, or both.

3. The method of claim 1, wherein the determining the granularity of quantization comprises determining a codebook size for each of the plurality of cells, and wherein the quantizing the CSI for each of the plurality of cells comprises quantizing the CSI for each cell based on a codebook of the codebook size determined for the cell.

4. The method of claim 3, wherein the determining the codebook size comprises:
determining a target interference suppression for each cell based on a long-term channel gain or received power for the cell, and
determining the codebook size for each cell based on the target interference suppression for the cell.

5. The method of claim 4, wherein the target interference suppression for each cell is determined based further on residual interference at the UE.

6. The method of claim 4, wherein the target interference suppression for each cell is determined based further on a target degradation in received signal quality at the UE due to quantization.

7. The method of claim 3, further comprising:
determining a subband size, or a reporting interval, or both for feedback of CSI for each of the plurality of cells, the subband size, or the reporting interval, or both for each cell being selected based on at least one parameter of the cell affecting performance of data transmissions from the plurality of cells to the UE; and
generating the CSI for each of the plurality of cells based on the subband size, or the reporting interval, or both for the cell.

8. The method of claim 7, further comprising:
determining variance of errors due to quantization for each cell based on the codebook size for the cell;
determining variance of errors due to interpolation in frequency, or time, or both for each cell based on the subband size, or the reporting interval, or both for the cell; and
determining additional interference from each cell based on the variance of errors due to quantization for the cell, the variance of errors due to interpolation in frequency, or time, or both for the cell, and a long-term channel gain for the cell.

9. The method of claim 8, wherein the variance of errors due to quantization is modeled with a function of codebook size, and wherein the variance of errors due to interpolation in frequency, or time, or both is modeled with a function of subband size, or reporting interval, or both.

10. The method of claim 7, wherein the codebook size and at least one of the subband size or the reporting interval are jointly determined by evaluating different combinations of codebook size and at least one of subband size or reporting interval.

11. The method of claim 7, wherein the codebook size and at least one of the subband size or the reporting interval are jointly determined by alternatively fixing the codebook size and varying each of the at least one of the subband size or the reporting interval or fixing the at least one of the subband size or the reporting interval and varying the codebook size.

12. The method of claim 1, wherein the determining the granularity of quantization comprises determining a number of quantization bits for each cell based on a long-term channel gain for the cell, a long-term channel gain for a designated cell, and a number of quantization bits for the designated cell.

13. The method of claim 1, wherein the CSI for each cell comprises at least one channel vector, or at least one equivalent channel vector, or at least one eigenvector, or a combination thereof.

14. The method of claim 1, further comprising:
determining a subband size for feedback of CSI for each of the plurality of cells, the subband size for each cell being selected based on at least one parameter of the cell affecting performance of data transmissions from the plurality of cells to the UE; and
generating the CSI for each of the plurality of cells based on the subband size for the cell.

15. The method of claim 1, further comprising:
determining a reporting interval for feedback of CSI for each of the plurality of cells, the reporting interval for each cell being selected based on at least one parameter of the cell affecting performance of data transmissions from the plurality of cells to the UE; and
generating the CSI for each of the plurality of cells based on the reporting interval for the cell.

16. The method of claim 1, wherein jointly determining granularity of quantization of CSI comprises jointly determining codebook sizes and at least one of subband sizes or reporting intervals.

17. The method of claim 16, wherein the codebook sizes and at least one of the subband sizes or the reporting intervals are determined further based in part on at least one feedback overhead criterion.

18. The method of claim 1, further comprising:
receiving data transmission from a set of cells among the plurality of cells, the data transmission being sent based on the reported CSI for the set of cells.

19. The method of claim 1, further comprising:
receiving data transmission from a cell among the plurality of cells, the data transmission being sent based on at least one precoding vector determined based on the reported CSI for the plurality of cells.

20. The method of claim 1, wherein said joint determining is further based at least in part on a feedback overhead criterion.

21. The method of claim 20, wherein the granularity of quantization for each cell comprises a subband size, and wherein the codebook size and the subband size are jointly determined.

22. An apparatus for wireless communication, comprising:
means for jointly determining granularity of quantization of channel state information (CSI) for each of a plurality of cells, the granularity of quantization for each cell being determined, along with the granularities of quantization for the other cells of the plurality of cells, based at least in part on a joint interference criterion of data transmissions from the plurality of cells to a user equipment (UE);
means for quantizing the CSI for each respective cell of the plurality of cells based on the granularity of quantization jointly determined for the respective cell; and
means for reporting the CSI for the plurality of cells.

23. The apparatus of claim 22, wherein the granularity of quantization for each cell is further determined based on at least one parameter of each cell affecting performance of data transmissions from the plurality of cells to the UE, wherein the at least one parameter of each cell comprises a long-term channel gain between the cell and the UE, or received power of the cell at the UE, or both.

24. The apparatus of claim 22, wherein the means for determining the granularity of quantization comprises means for determining a codebook size for each of the plurality of cells, and wherein the means for quantizing the CSI for each of the plurality of cells comprises means for quantizing the CSI for each cell based on a codebook of the codebook size determined for the cell.

25. The apparatus of claim 22, wherein the means for determining the granularity of quantization comprises means for determining a number of quantization bits for each cell based on a long-term channel gain for the cell, a long-term channel gain for a designated cell, and a number of quantization bits for the designated cell.

26. The apparatus of claim 22, further comprising:
means for determining a subband size for feedback of CSI for each of the plurality of cells, the subband size for each cell being selected based on at least one parameter of the cell affecting performance of data transmissions from the plurality of cells to the UE; and
means for generating the CSI for each of the plurality of cells based on the subband size for the cell.

27. The apparatus of claim 22, further comprising:
means for determining a reporting interval for feedback of CSI for each of the plurality of cells, the reporting interval for each cell being selected based on at least one parameter of the cell affecting performance of data transmissions from the plurality of cells to the UE; and
means for generating the CSI for each of the plurality of cells based on the reporting interval for the cell.

28. The apparatus of claim 22, wherein the means for jointly determining granularity of quantization is further configured to jointly determine granularity of quantization based at least in part on a feedback overhead criterion.

29. An apparatus for wireless communication, comprising:
at least one processor configured to jointly determine granularity of quantization of channel state information (CSI) for each of a plurality of cells, the granularity of quantization for each cell being determined, along with the granularities of quantization for the other cells of the plurality of cells, based at least in part on a joint interference criterion of data transmissions from the plurality of cells to a user equipment (UE), to quantize the CSI for each respective cell of the plurality of cells based on the granularity of quantization jointly determined for the respective cell, and to report the CSI for the plurality of cells.

30. The apparatus of claim 29, wherein the granularity of quantization for each cell is further determined based on at least one parameter of each cell affecting performance of data transmissions from the plurality of cells to the UE, wherein the at least one parameter of each cell comprises a long-term channel gain between the cell and the UE, or received power of the cell at the UE, or both.

31. The apparatus of claim 29, wherein the at least one processor is configured to determine a codebook size for each of the plurality of cells, and to quantize the CSI for each cell based on a codebook of the codebook size determined for the cell.

32. The apparatus of claim 29, wherein the at least one processor is configured to determine a number of quantization bits for each cell based on a long-term channel gain for the cell, a long-term channel gain for a designated cell, and a number of quantization bits for the designated cell.

33. The apparatus of claim 29, wherein the at least one processor is configured to determine a subband size for feedback of CSI for each of the plurality of cells, the subband size for each cell being selected based on at least one parameter of the cell affecting performance of data transmissions from the plurality of cells to the UE, and to generate the CSI for each of the plurality of cells based on the subband size for the cell.

34. The apparatus of claim 29, wherein the at least one processor is configured to determine a reporting interval for feedback of CSI for each of the plurality of cells, the reporting interval for each cell being selected based on at least one parameter of the cell affecting performance of data transmissions from the plurality of cells to the UE, and to generate the CSI for each of the plurality of cells based on the reporting interval for the cell.

35. The apparatus of claim 29, wherein the processor is further configured to jointly determine granularity of quantization based at least in part on a feedback overhead criterion.

36. A computer program product, comprising:
a non-transitory computer-readable medium comprising:
code for causing at least one computer to jointly determine granularity of quantization of channel state information (CSI) for each of a plurality of cells, the granularity of quantization for each cell being determined, along with the granularities of quantization for the other cells of the plurality of cells, based at least in part on a joint interference criterion of data transmissions from the plurality of cells to a user equipment (UE),
code for causing the at least one computer to quantize the CSI for each respective cell of the plurality of cells based on the granularity of quantization jointly determined for the respective cell, and
code for causing the at least one computer to report the CSI for the plurality of cells.

37. The computer program product of claim 36, wherein the code for causing at least one computer to jointly determine granularity of quantization of CSI for each of a plurality of cells is further configured to determine the granularity of quantization for each cell, along with the granularities of quantization for the other cells of the plurality of cells, based at least in part on a feedback overhead criterion.

38. A method for wireless communication, comprising:
receiving channel state information (CSI) for a cell among a plurality of cells, the CSI for the cell being quantized by a user equipment (UE) in accordance with granularity of quantization jointly determined for the cell, along with granularities of quantization for the other cells of the plurality of cells, based at least in part on a joint interference criterion of data transmissions from the plurality of cells to the UE; and
sending data transmission from the cell to the UE based on the received CSI, the data transmission being sent by at least one cell among the plurality of cells, the at least one cell including the cell.

39. The method of claim 38, wherein the granularity of quantization for the cell is further determined based on at least one parameter of the cell affecting performance of data transmissions from the plurality of cells to the UE, wherein the at least one parameter of the cell comprises a long-term channel gain between the cell and the UE, or received power of the cell at the UE, or both.

40. The method of claim 38, further comprising:
determining a codebook size selected for the cell; and
obtaining at least one channel vector, or at least one equivalent channel vector, or at least one eigenvector for the cell based on the CSI for the cell and a codebook of the codebook size selected for the cell.

41. The method of claim 38, further comprising:
determining a subband size selected for the cell; and
obtaining at least one channel vector, or at least one equivalent channel vector, or at least one eigenvector for at least one subband of the subband size selected for the cell.

42. The method of claim 38, further comprising:
determining a reporting interval selected for the cell, wherein the CSI for the cell is sent by the UE based on the reporting interval for the cell.

43. The method of claim 38, wherein the at least one cell includes a set of cells among the plurality of cells, wherein precoding vectors for the set of cells are determined based on CSI reported by the UE for the set of cells, and wherein the data transmission is sent by the set of cells to the UE based on the precoding vectors.

44. The method of claim 38, wherein the at least one cell includes only the cell, wherein at least one precoding vector is determined based on CSI reported by the UE for the plurality of cells, and wherein the data transmission is sent by the cell to the UE based on the at least one precoding vector to steer the data transmission toward the UE and away from at least one UE served by at least one other cell in the plurality of cells.

45. The method of claim 38, wherein said joint determining is further based at least in part on a feedback overhead criterion.

46. An apparatus for wireless communication, comprising:
means for receiving channel state information (CSI) for a cell among a plurality of cells, the CSI for the cell being quantized by a user equipment (UE) in accordance with granularity of quantization jointly determined for the cell, along with granularities of quantization for the other cells of the plurality of cells, based at least in part on a joint interference criterion of data transmissions from the plurality of cells to the UE; and
means for sending data transmission from the cell to the UE based on the received CSI, the data transmission being sent by at least one cell among the plurality of cells, the at least one cell including the cell.

47. The apparatus of claim 46, wherein the granularity of quantization for the cell is further determined based on at least one parameter of the cell affecting performance of data transmissions from the plurality of cells to the UE, wherein the at least one parameter of the cell comprises a long-term channel gain between the cell and the UE, or received power of the cell at the UE, or both.

48. The apparatus of claim 46, further comprising:
means for determining a codebook size selected for the cell; and
means for obtaining at least one channel vector, or at least one equivalent channel vector, or at least one eigenvector for the cell based on the CSI for the cell and a codebook of the codebook size selected for the cell.

49. The apparatus of claim 46, further comprising:
means for determining a subband size selected for the cell; and
means for obtaining at least one channel vector, or at least one equivalent channel vector, or at least one eigenvector for at least one subband of the subband size selected for the cell.

50. The apparatus of claim 46, further comprising:
means for determining a reporting interval selected for the cell, wherein the CSI for the cell is sent by the UE based on the reporting interval for the cell.

51. The apparatus of claim 46, wherein the granularity of quantization jointly determined for the cell, along with granularities of quantization for the other cells of the plurality of cells, is further based at least in part on a feedback overhead criterion.

52. An apparatus for wireless communication, comprising:
at least one processor configured to receive channel state information (CSI) for a cell among a plurality of cells, the CSI for the cell being quantized by a user equipment (UE) in accordance with granularity of quantization jointly determined for the cell, along with granularities of quantization for the other cells of the plurality of cells, based at least in part on a joint interference criterion of data transmissions from the plurality of cells to the UE, and to send data transmission from the cell to the UE based on the received CSI, the data transmission being sent by at least one cell among the plurality of cells, the at least one cell including the cell.

53. The apparatus of claim 52, wherein the granularity of quantization for the cell is further determined based on at least one parameter of the cell affecting performance of data transmissions from the plurality of cells to the UE, wherein the at least one parameter of the cell comprises a long-term channel gain between the cell and the UE, or received power of the cell at the UE, or both.

54. The apparatus of claim 52, wherein the at least one processor is configured to determine a codebook size selected for the cell, and to obtain at least one channel vector, or at least one equivalent channel vector, or at least one eigenvector for the cell based on the CSI for the cell and a codebook of the codebook size selected for the cell.

55. The apparatus of claim 52, wherein the at least one processor is configured to determine a subband size selected for the cell, and to obtain at least one channel vector, or at least one equivalent channel vector, or at least one eigenvector for at least one subband of the subband size selected for the cell.

56. The apparatus of claim 52, wherein the at least one processor is configured to determine a reporting interval selected for the cell, and wherein the CSI for the cell is sent by the UE based on the reporting interval for the cell.

57. The apparatus of claim 52, wherein the granularity of quantization jointly determined for the cell, along with granularities of quantization for the other cells of the plurality of cells, is further based at least in part on a feedback overhead criterion.

58. A computer program product, comprising:
a non-transitory computer-readable medium comprising:
code for causing at least one computer to receive channel state information (CSI) for a cell among a plurality of cells, the CSI for the cell being quantized by a user equipment (UE) in accordance with granularity of quantization jointly determined for the cell, along with granularities of quantization for the other cells of the plurality of cells, based at least in part on a joint interference criterion of data transmissions from the plurality of cells to the UE, and
code for causing the at least one computer to send data transmission from the cell to the UE based on the received CSI, the data transmission being sent by at least one cell among the plurality of cells, the at least one cell including the cell.

59. The computer program product of claim 58, wherein the granularity of quantization jointly determined for the cell, along with granularities of quantization for the other cells of the plurality of cells, is further based at least in part on a feedback overhead criterion.

\* \* \* \* \*